March 24, 1959     R. CRABBE ET AL     2,878,675
DEVICE FOR THE CONTINUOUS DETERMINATION OF THE
SPECIFIC GRAVITY OF LIQUIDS
Filed July 5, 1957     2 Sheets-Sheet 1

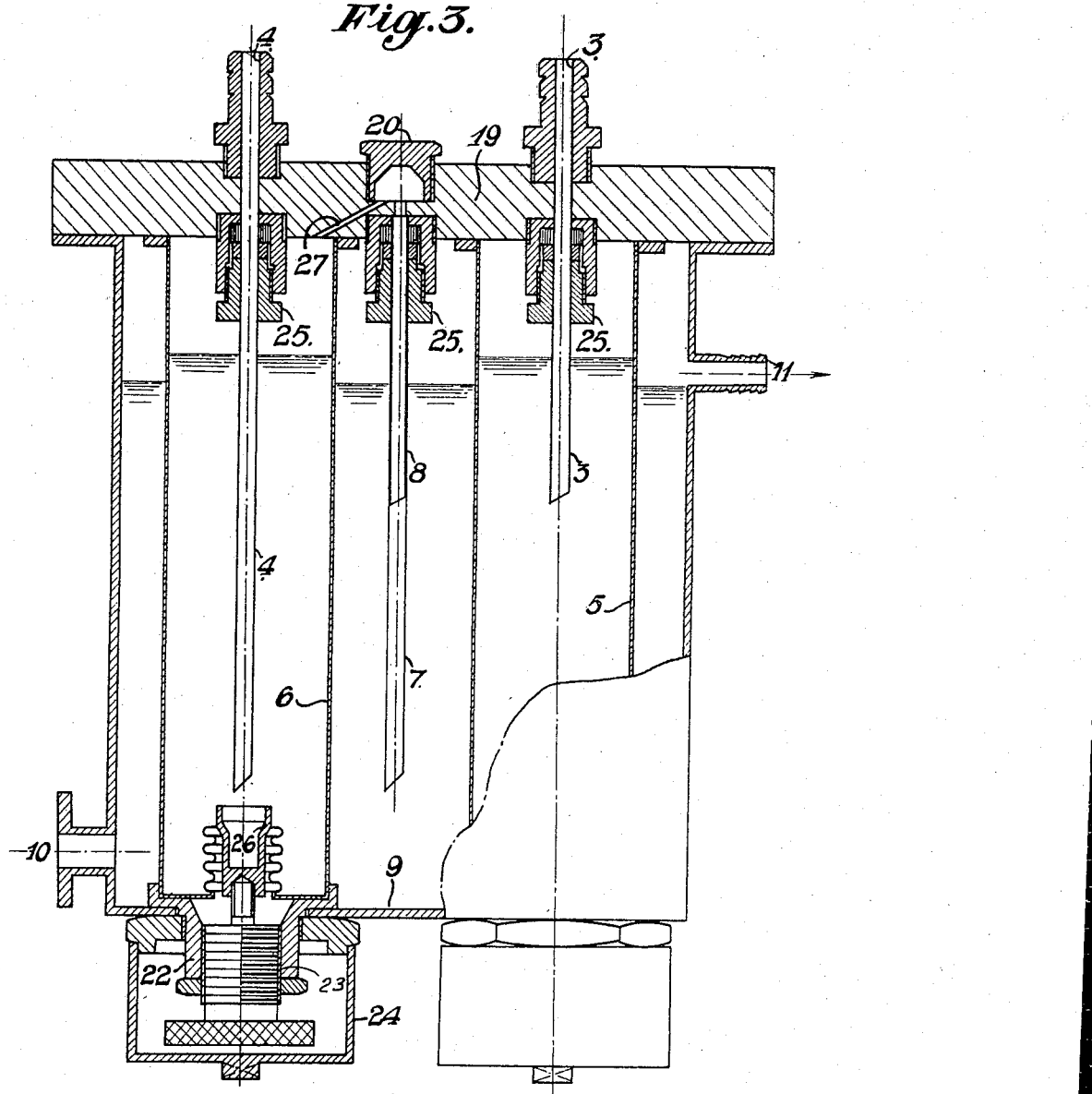

United States Patent Office 2,878,675
Patented Mar. 24, 1959

2,878,675

DEVICE FOR THE CONTINUOUS DETERMINATION OF THE SPECIFIC GRAVITY OF LIQUIDS

René Crabbe, Boitsfort-Brussels, and Jean Menier, Ixelles-Brussels, Belgium, assignors to Solvay & Cie, Brussels, Belgium, a Belgian company Application July 5, 1957, Serial No. 670,072

Claims priority, application Belgium July 12, 1956

6 Claims. (Cl. 73—439)

The present invention relates to a manometric apparatus for the continuous determination of the specific gravity of liquids, referred to hereinafter as "analyzing liquids," from the difference between the specific gravity of the said analyzing liquids and the specific gravity of a control liquid. According to the apparatus of the invention, the effects of the variations of temperature of the analyzing liquid are reduced to a minimum without recourse to the use of a thermostat, and it is also possible to check at any instant and in a very simple manner the zero setting of the manometer.

The apparatus functions to introduce at two different levels in an analyzing liquid, an immiscible liquid serving as a manometric liquid, said manometric liquid being previously introduced at two different levels in a control liquid immiscible with the manometric liquid said control liquid being contained in two separate vessels and brought to the same temperature as the analyzing liquid, the levels of introduction of the manometric liquid into the control liquid being selected in relation to the levels of introduction of the manometric liquid into the analyzing liquid in such manner that the measured pressure difference is nil when the specific gravity of the analyzing liquid is equal to the specific gravity of the control liquid.

Figure 1:
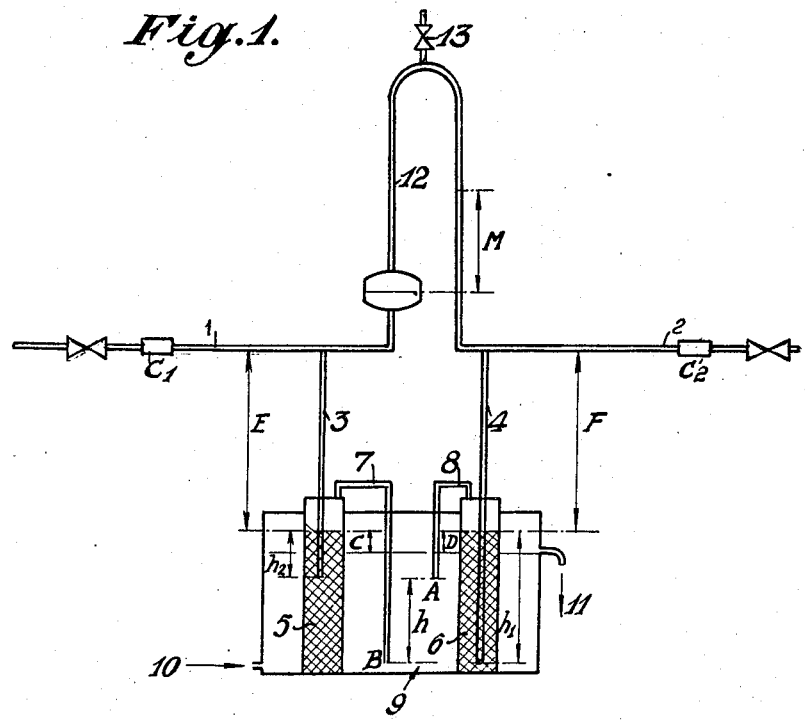
Figure 2:
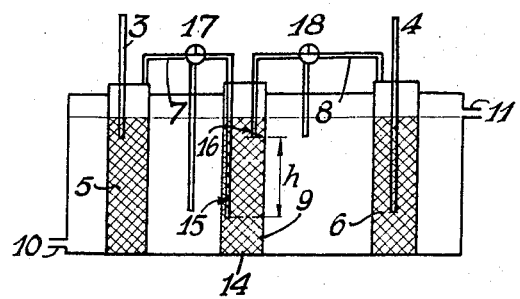

The invention is carried out by the device shown in two embodiments in Figs. 1 and 2. Fig. 3 is a detailed showing of the sensing structure of Fig. 1. It is, of course, to be understood that this device may be varied without departing from the scope of the invention.

In Fig. 1, the reference numbers 1 and 2 denotes two inlet tubes for the manometric liquid the supply of which to each of these tubes is maintained constant and equal by means of two carefully chosen capillary tubes $C_1$ and $C_2$. The manometric liquid is then introduced into the control liquid contained in the vessels 5 and 6 by means of the tubes 3 and 4, whose levels of immersion in the control liquid are $h_2$ and $h_1$ respectively. The two vessels 5 and 6 are disposed in the vessel 9 containing the analyzing liquid, the control liquid thus being brought substantially to the same temperature as the analyzing liquid. For this reason, the vessels 5 and 6 will hereinafter be termed "compensation vessels." The manometric liquid bubbles through the control liquid and leaves at the top of the compensation vessels 5 and 6 and is conducted unto the analyzing liquid contained in the vessel 9 by means of the tubes 7 and 8 which are immersed therein to reach the levels B and A, respectively, which are at a distance $h$ from one another. The tube 7, which connects the compensation vessel 5 to vessel 9, is more deeply immersed in the analyzing liquid, whereas the tube 3, feeding the manometric liquid to the control liquid contained in the compensation vessel 5, is less deeply immersed. The tube 8 connecting the compensation vessel 6 to vessel 9 and the tube 4 feeding the manometric liquid into the control liquid contained in the compensation vessel 6 are inversely arranged with respect to the tubes 7 and 3. The tubes 3 and 4, on the one hand, and the tubes 7 and 8, on the other hand, are arranged in such a manner that the difference between the levels $h_1$ and $h_2$ is equal to the difference between the levels A and B, that is to say $$h_1-h_2=h$$

The analyzing liquid is introduced into the vessel 9 by means of the inlet 10 and is removed via the outlet 11. A manometer 12, fitted with a valve 13 for the purpose of bringing the level of the liquid to a convenient height, indicates the pressure difference between the feeding tubes of the manometric liquid 3 and 4 in the compensation vessels 5 and 6.

The determination of the specific gravity of a liquid is effected as follows:

M is the manometer reading of the height of the manometric liquid,
$r$ is the specific gravity of the control liquid,
$a$ is the specific gravity of the analyzing liquid,
$l$ is the specific gravity of the manometric liquid,
C and D are the difference between the height of the control liquid in the respective compensation vessels 5 and 6 and the height of the analyzing liquid in the vessel 9, and
E and F are the respective distance between the feeding tubes 1 and 2 of the manometric liquid and the upper level of the control liquid in the respective compensation vessels 5 and 6.

Then $$M_l=(h_1-h_2)(r-l)-h(a-l)+l[(C+E)-(D+F)]$$

If $$C+E=D+F$$

then $$M_l=(h_1-h_2)(r-l)-h(a-l)$$

and if $$h_1-h_2=h$$

then $$M_l=h(r-a)$$

and $$M=h\frac{r-a}{l}$$

Since $h$ may be fixed once and for all, it is possible, when knowing $l$, to obtain $(r-a)$ by a simple reading of M. It is then very easy to determine $a$ from the difference $(r-a)$.

On the other hand, it can be seen that if the specific gravity $a$ of the analyzing liquid is equal to the specific gravity $r$ of the control liquid, $M=0$, that is to say the pressure difference observed is nil.

Fig. 2 shows the same device fitted with an additional vessel 14 containing the control liquid, said vessel 14 being likewise disposed in the vessel 9. This vessel enables the zero of the manometer to be controlled at any instant. To this effect, the tubes 7 and 8 are fitted with the respective three-way-cocks 17 and 18 which enable the circulation of the manometric liquid towards the vessel 9 to be interrupted and to be directed towards the vessel 14 by means of the tubes 15 and 16 symmetrically arranged with respect to the tubes 7 and 8. The immersion levels of the tubes 15 and 16 in the control liquid are at a distance $h$ from one another.

The apparatus according to the invention thus permits the specific gravity of a liquid as well as the properties influencing the specific gravity of liquids to be determined in a continuous manner. By way of a non-limitative example, it is possible according to the apparatus of the invention to determine rapidly by a simple measurement the alkali metal concentration of amalgam solutions in mercury, said amalgams being obtained from any source, for example from electrolytic cells. In this case, water is taken as the manometric liquid and mercury as the control liquid. It is also possible to determine in the same manner the concentration of said solutions or of alkaline lyes.

A detailed showing of the sensing structure usable with the system of Fig. 1, which is however not limitative, is shown in Fig. 3. The apparatus comprises a cylindrical vessel 9 containing the analyzing liquid which is introduced through the inlet 10 and removed through the outlet 11. The lid of the vessel 9 is formed by the support plate 19 to which the two compensation vessels 5 and 6 are secured, these vessels being formed by tubes which are also secured to the bottom of the vessel 9. Through the tubes 3 and 4 the manometric liquid is fed into the compensation vessels 5 and 6. These tubes and also the tubes 7 and 8 immersed in the analyzing liquids are made of glass and fixed to the support plate 19 by means of the Wilson type joints 25. The communication between the tubes 3 and 7, on the one hand, and 4 and 8, on the other hand, takes place by means of the channels 27 extending through the support plate. The cavity required for the continuation of these channels is closed by a stopper 20. The cavity enables the air bubbles to be removed from the manometric liquid when the apparatus is started. The compensation vessels 5 and 6 are secured to the bottom of the vessel 9 by means of a piece 22 secured with the aid of a set screw. The piece 22 in its turn supports an adjusting screw 23 with a set screw which acts on a metal bellows 26. It is thus possible to attain a fine regulation of the zero setting of the manometer by modifying if necessary the height of the mercury in the compensation vessels 5 and 6. The adjusting screw 23 is protected by the casing 24. The connections with the manometer 12 and the feed tubes 1 and 2 of the manometric liquid are affected according to the device illustrated in Fig. 1.

We claim:

1. A device for the determination of the specific gravity of a liquid comprising, in combination, a measuring vessel adapted to receive the test liquid to be measured, means for introducing said liquid into said vessel and means for withdrawing said liquid from said vessel, two compensation vessels disposed in the measuring vessel and adapted to extend into said test liquid and to contain a control liquid whereby said control liquid will be maintained at the same temperature as the test liquid, means for circulating a manometric liquid successively into the control liquid and into the test liquid, said last-named means including distributing means disposed to supply said manometric liquid at different levels in the two compensation vessels and at two different levels in the measuring vessel, the levels of feeding of the manometric liquid into the compensation vessels being related to the levels of feeding of the manometric liquid into the measuring vessel in such manner that the difference of the measured pressures between the levels of feeding of the manometric liquid into the control liquid and between the levels of feeding of the manometric liquid into the test liquid becomes zero when the specific gravity of the test liquid is equal to the specific gravity of the control liquid.

2. A device for the determination of the specific gravity of a liquid comprising, in combination, a measuring vessel adapted to receive the test liquid to be measured, means for introducing said liquid into said vessel and means for withdrawing said liquid from said vessel, two compensation vessels disposed in the measuring vessel and adapted to extend into said test liquid and to contain a control liquid whereby said control liquid will be maintained at the same temperature as the test liquid, means for circulating a manometric liquid successively into the control liquid and into the test liquid, said last-named means including distributing means disposed to supply said manometric liquid at different levels in the two compensation vessels and at two different levels in the measuring vessel, the difference between the levels of feeding of the manometric liquid into the compensation vessels being equal to the difference between the levels of feeding of the manometric liquid into the measuring vessel.

3. A device as defined in claim 1, wherein said distributing means comprises two feeding tubes extending into the compensation vessels with one tube more deeply extending than the other, and two second tubes extending different distances into said measuring vessel connecting the upper portion of the compensation vessels with the measuring vessel for the circulation of the manometric liquid from the control liquid to the test liquid, the second tube less deeply extending connecting the measuring vessel with the compensation vessel having the feed tube more deeply extending into it, with the difference between the immersion levels of the tubes feeding the manometric liquid into the compensation vessels being equal to the difference between the immersion levels in the measuring vessel of the second tubes.

4. Device according to claim 3 further comprising a vessel for adjusting the manometer to zero position adapted to contain control liquid and arranged in the measuring vessel, two tubes for circulating the manometric liquid from the compensation vessels to the vessel for adjusting the manometer to zero position, said tubes being symmetrically arranged with respect to the tubes which connect the compensation vessels with the measuring vessel and whose levels of immersion in the control liquid are identical with those of the connecting tubes in the test liquid, a three-way-cock being provided in said connecting tubes for substituting the vessel for adjusting the manometer to zero for the measuring vessel.

5. Device according to claim 4 wherein said measuring vessel comprises a cylindrical vessel wherein the analyzing liquid circulates and which contains the two compensation vessels, said compensation vessels being fixed to a support plate serving as a lid for said cylindrical vessel and to the bottom of the cylindrical vessel, the various tubes for feeding the manometric liquid into the control liquid and into the analyzing liquid being likewise fixed to the support plate by means of Wilson type joints, the communication between the tubes extending the compensation vessels and in the measuring vessel being effected by channels extending into the support plate.

6. Device according to claim 5 further comprising a metal bellows at the base of each of the compensation vessels, said bellows permitting a fine adjustment of the zero of the manometer.

References Cited in the file of this patent

UNITED STATES PATENTS

| | | |
|---|---|---|
| 1,605,171 | Chance | Nov. 2, 1926 |
| 2,394,549 | Howe | Feb. 12, 1946 |

FOREIGN PATENTS

| | | |
|---|---|---|
| 741,197 | Germany | Nov. 6, 1943 |
| 58,072 | France | May 6, 1953 |